United States Patent [19]
Goldsmith

[11] Patent Number: 5,988,264
[45] Date of Patent: Nov. 23, 1999

[54] DYNAMIC INSULATION AND AIR CONDITIONING AND RADIANT HEATING SYSTEM

[76] Inventor: Aaron Goldsmith, 24806 Alexandra Ct, Calabasas, Calif. 91302

[21] Appl. No.: 09/022,167

[22] Filed: Feb. 11, 1998

[51] Int. Cl.[6] .................................................. F25B 29/00
[52] U.S. Cl. ........................ 165/48.1; 62/314; 165/53; 165/56; 165/60; 237/69; 169/37; 169/48; 169/57
[58] Field of Search ............................. 165/48.1, 60, 56, 165/53; 237/69; 62/171, 314, 304; 169/48, 57, 37

[56] References Cited

U.S. PATENT DOCUMENTS

| | | | |
|---|---|---|---|
| 430,822 | 6/1890 | Beckford et al. . | |
| 1,050,907 | 1/1913 | Banker | 165/53 X |
| 1,375,417 | 4/1921 | Richardson | 62/314 |
| 2,187,954 | 1/1940 | Smith | 165/60 X |
| 2,637,181 | 5/1953 | Schramm . | |
| 2,767,961 | 10/1956 | Frankland | 165/53 X |
| 3,964,268 | 6/1976 | DiPeri | 62/121 |

Primary Examiner—Harold Joyce

[57] ABSTRACT

A system for cooling, heating and fire-protecting an enclosure or dwelling, consisting of six principal entities acting in cooperation. The first is an expansive system of wide, shallow ducting installed just outboard and against the innermost wall layers of the peripheral walls, ceiling and at times, the floor, thermally intimate but physically isolated from the interior volume of the enclosure. The second is an evaporatively-cooled air source, supplying the duct system, which cools the innermost wall layers and in turn, the interior volume, by radiation and convection. The third entity, being an encompassing layer of efficient insulation, just outboard of the ducting and within the enclosure, biasing the cooling and heating action to the interior volume. The fourth is a network of hot-water circulating tubes, lying within, or adjacent to said cooling ducts, and against the innermost wall layer, or inboard plate thereof. The fifth entity utilizes the in-place source of water in the peripheral walls and ceiling, for incorporation of heat-activated fire a suppression units therein, spraying into both, rooms and the duct system, as well. The last (sixth) entity provides for humidity control, convection, and 'sensible' cooling of infiltration air by a limited size, integral air-conditioner and independent air circulation fans within the interior volume of the enclosure or dwelling.

12 Claims, 4 Drawing Sheets

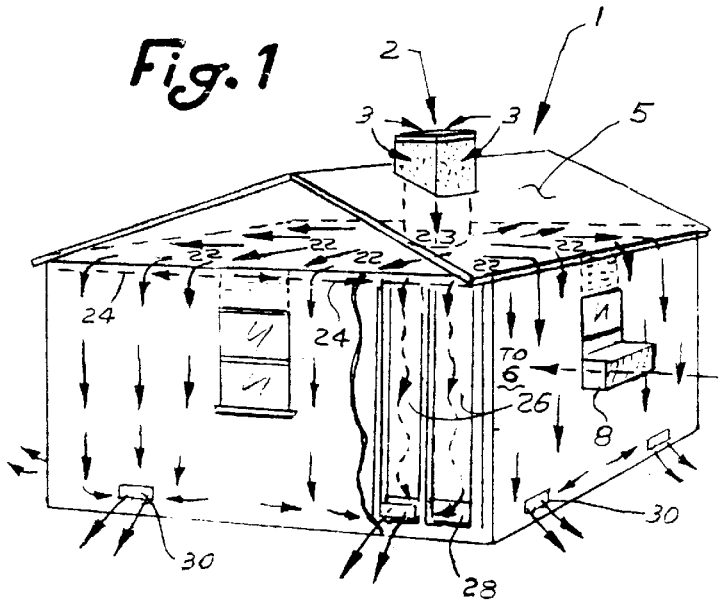
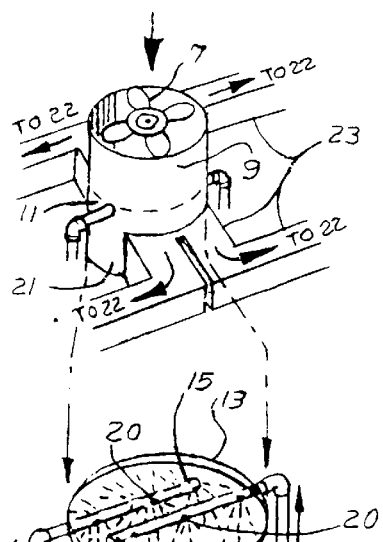
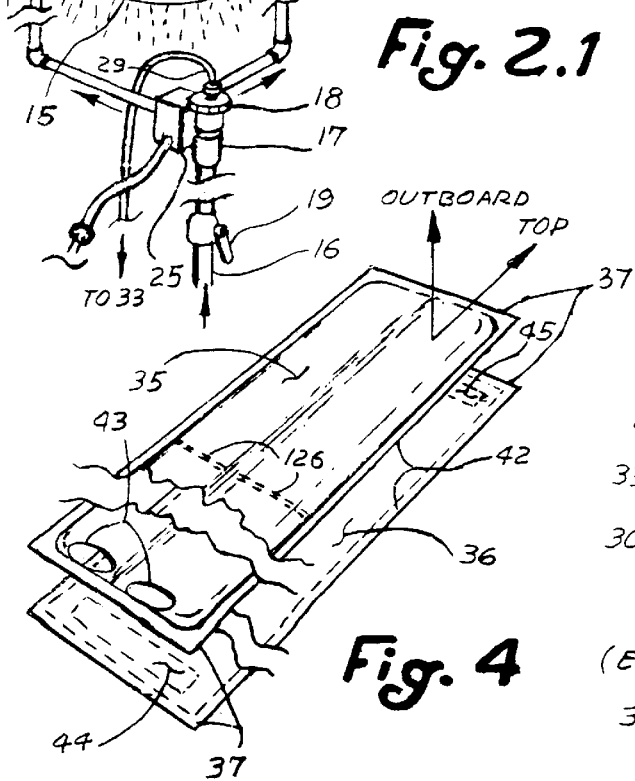
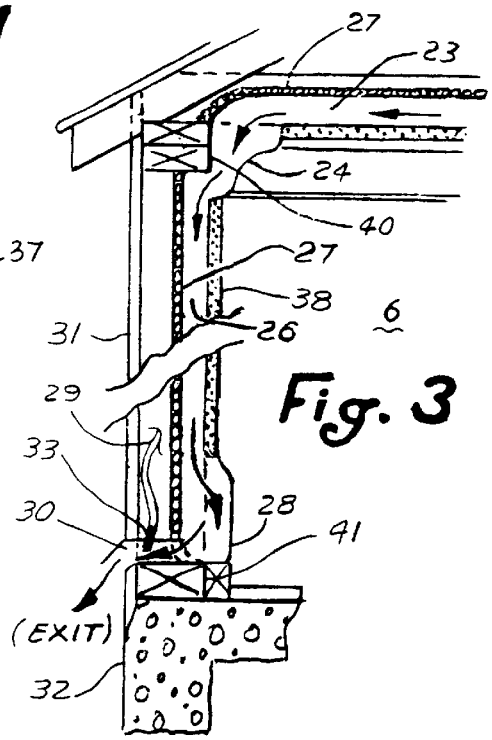

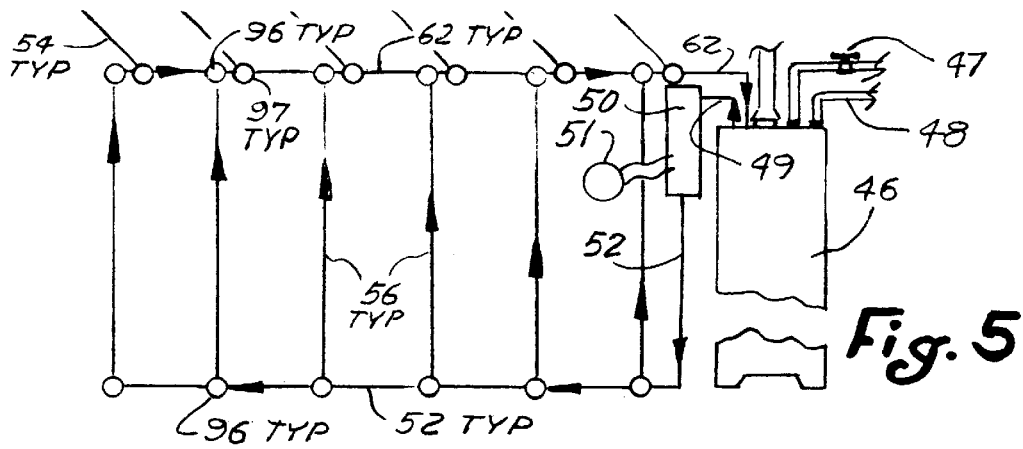
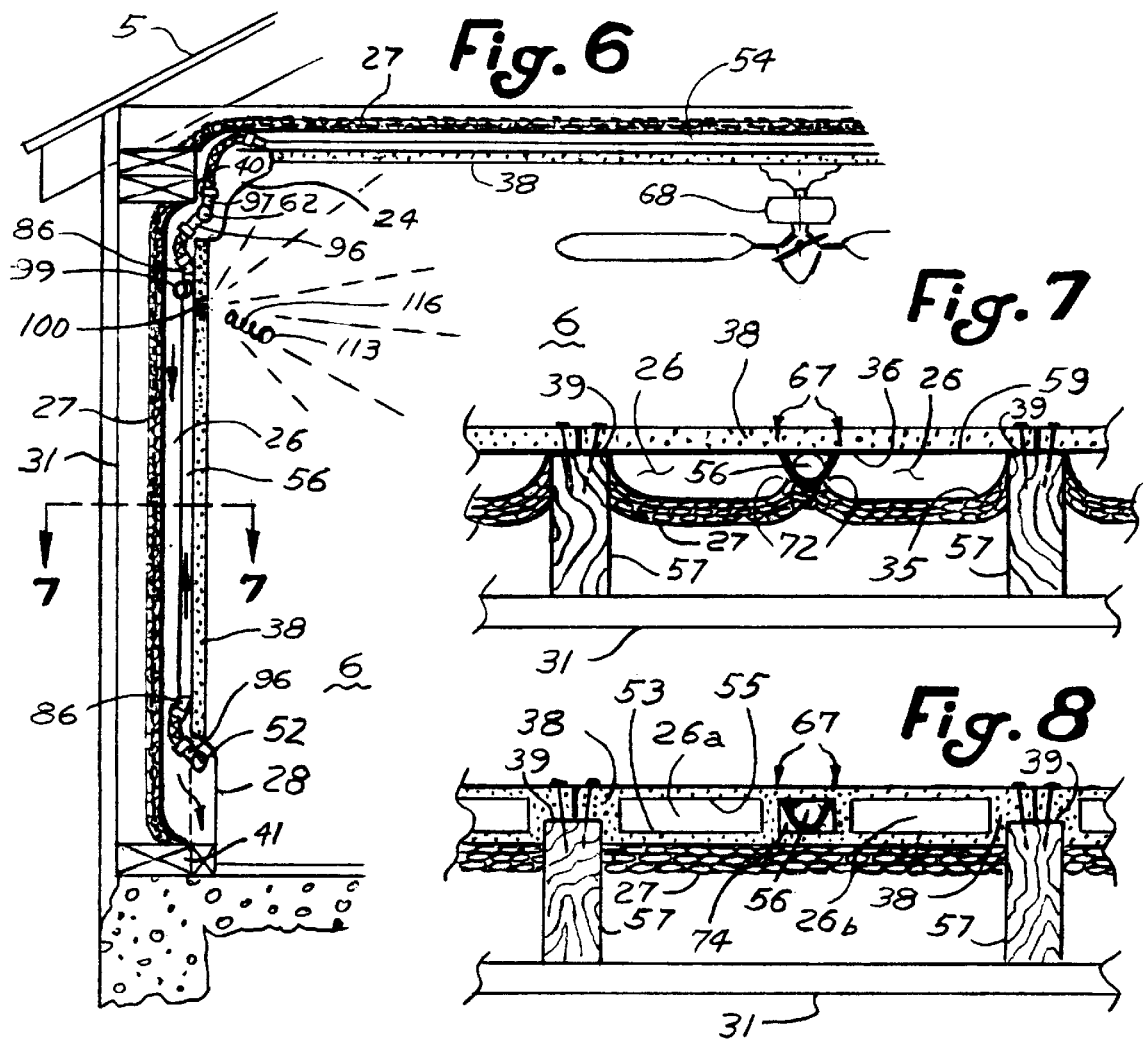

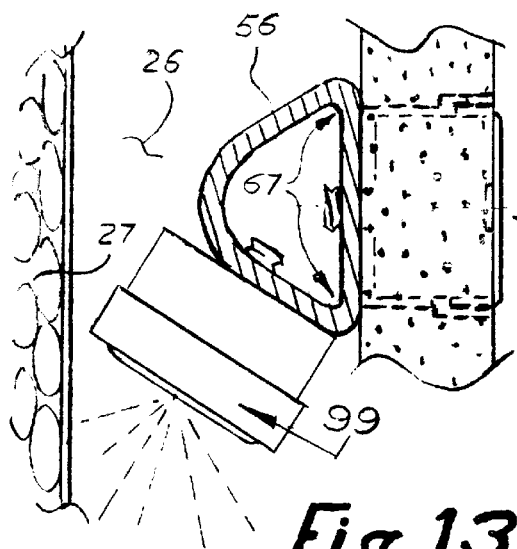
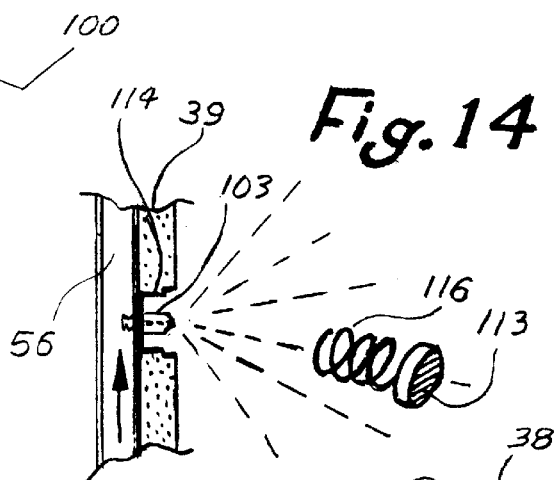
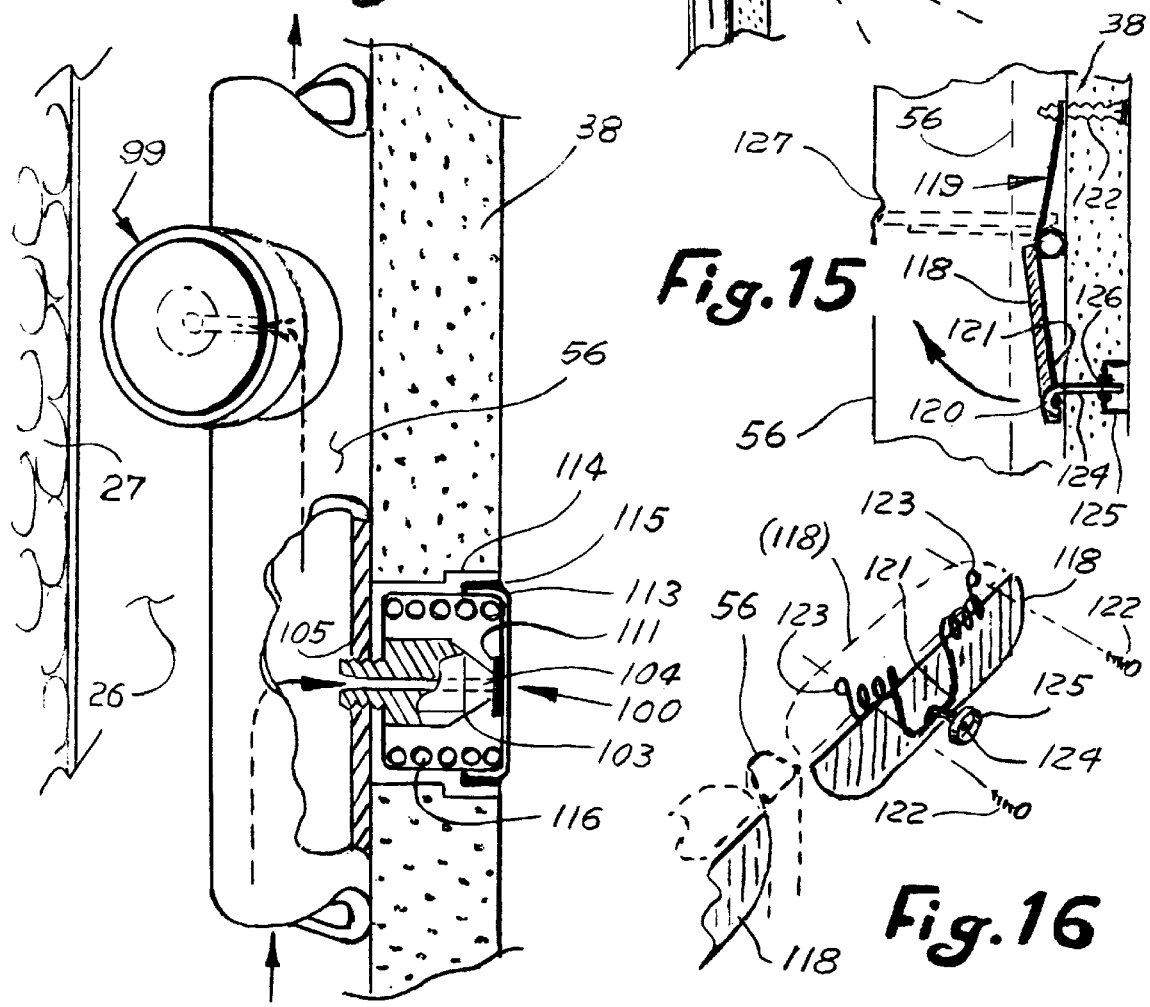

DYNAMIC INSULATION AND AIR CONDITIONING AND RADIANT HEATING SYSTEM

BACKGROUND OF THE INVENTION

1. Field of the Invention

This invention relates to the field of air conditioning and heating and more specifically, an environmental management system (Dynamic Insulation) for dwellings, fixed and mobile, storehouses, containers and rigid or flexible temporary structures, involving efficient passive insulation, exterior to primary evaporative-para-transfer-cooling of walls with secondary, 'sensible' air conditioning and air circulation means, water-based radiant heating and water-spray fire-suppression in the interior volume, all working together synergistically for greatest cost-benefit, safety and comfort.

2. Description of Prior Art

The principle of cooling an air stream by evaporative-humidification for the purpose of reducing the temperature within an enclosed space, or volume, such as a dwelling, is well established. Devices for accomplishing this, with improvements through the years, have resulted in an array of methods with varying degrees of success, depending upon their cost, complexities and effective comfort, the most comfortable being those which provide cooling without the introduction of highly humid air into the interior volume and to occupants.

Unfortunately, systems developed to do this have resorted to external heat exchangers requiring multiple fans exposed to the exterior which are more costly, complex and bulky, wasting energy and water in the process.

Adding a small window or through-the-wall, self-contained mechanical air conditioner to a central evaporatively-cooled air system is, sometimes a compromise solution, which costs less to buy and operate than a central mechanical air conditioner system with distributed outlets and offers some added comfort in the room or space allotted to the 'sensible' cooler. However, some prior art teaches a method of sending evaporatively-cooled air to the outside of an enclosure in a film, or through channels formed by support beams or studs spaced between the outside layer and the innermost layer of walls and ceiling, or roof, without contact or mixing with the interior volume of sensibly-cooled air. In particular, in U.S. Pat. No. 2,637,181, Schramm describes a system involving an evaporatively-cooled air stream flowing from a roof unit into an attic space, for cooling said space above the presumably non-insulated ceiling and then exiting through short, broad elbow-shaped ducts, out of said attic and then downward outside, to direct flow alongside the exterior wall surfaces as a shield against outside thermal influx. No evaporatively-cooled air is introduced to the interior volume of the dwelling below the ceiling level.

In U.S. Pat. No. 3,964,268, DiPeri teaches a method, wherein an exterior heat-exchange unit uses an evaporatively-cooled airstream to remove heat from a second, ambient or 'dry' air stream without imparting any added humidity to said second stream, that is, 'sensibly' cooling it and using it to condition the interior volume of a dwelling. The heat drawn out therefrom, is removed by vaporizing into the first air stream, liquid water, dripped onto an array of parallel tubes, wrapped with gauze for water retention, over which the first air stream flows and then discharges onto the exterior of the roof surface or through channeling formed by the double-layer roof/ceiling construction of conventional industrial buildings. The saturation level of the humidified first stream is rarely complete, being on the average, from 70% to 80%, as are most conventional one-stage coolers of simple design, using the wetted pad principle. Any increase in saturation over that stated would generally require a spray, or mist introduction, or special mixing techniques, to gain excess water suspensions, which then could continue to evaporatively cool, down-stream. Any limitation in saturation severely reduces the ability of the first stream exhaust to continue to pull heat from the outside environment or the roof and wall channels, by latent heat of evaporation, i.e., 'drying', since the discharged air having no excess un-evaporated water therein, can only cool the area by co-mingling and averaging its kinetic energy with that of the immediate environment's higher kinetic energy.

The splitting of heat energy taken up by evaporating water into the first stream, and sharing between the second stream 'sensible' flow and the first stream's exterior "barrier flow", compromises the ability of the first steam to remove as much heat from the roof exterior, or peripheral walls, as it might, having already removed significant heat from the second stream and carried it along as 'gaseous' water vapor, so to speak. The first stream, therefore, cannot reach as low a temperature entering, say, the confinement of the walls, or ceiling, as it could if the flow had not passed through a prior heat exchanger at all. It, therefore becomes an ancillary or "secondary" cooling method only, relying on 'sensibly' cooled air for "primary" interior conditioning. A "primary" evaporative cooling method would require a cool layer to be maintained as close to the interior volume as possible, ready to remove heat from both the innermost wall layers themselves and any influx of heat from the outboard side, as well. The DiPeri invention in essence, teaches the replacement, of insulation with a moving blanket of cooler, but less than saturated air, while the present invention calls for an insulation layer of low thermal conductivity and high radiation reflectivity in both directions, as well as low convection values, to be placed between the exterior environment and the duct layer. This, with the addition of 'excess' moisture into the evaporatively-cooled air stream by mist means, increases the cooling potential of the system to qualify it as a "primary" means of heat rejection for the interior volume of an enclosure, with 'sensibly' cooled air being independently administered as a "secondary" cooling means.

In prior teachings, wherein evaporative-cooling is used for conditioning the interior volume, the introduction of water is usually controlled by means of a wetted surface exposed to an air stream, co-mixing so as to present as large a surface area as possible and means to recirculate the water for continued presentation, with conservation in mind. However, a presentation of water sometimes is through mist or spray means as taught in U.S. Pat. No. 4,308,222, Goettel, et al., wherein an excess of water is sprayed into the air, counter to the air flow and allowed to evaporate downstream, in two tandem expansion chambers, with means to recover excess water and subsequently drain it away, the realization being that excess moisture, if allowed to enter the ducting and interior volume of the dwelling or enclosure will cause increased corrosion to ducting and impinge upon occupants, furniture and paper goods, etc., causing discomfort and possible damage thereto.

In the present invention, excess water in the airstream is actually exploited for its ability to evaporate within water and corrosion-proof ducting downstream, for increased cooling capacity throughout the ducting area surrounding the innermost peripheral walls, ceiling (and floor) of the interior volume of a dwelling, or enclosure.

BRIEF SUMMARY OF THE INVENTION

This invention pertaining primarily to the exploitation of the principle of "Dynamic Insulation" in cooling and in heating, in an economical and effective way, the interior volumes of a variety of enclosures, combines an envelope of efficient insulation for passive blocking of thermal loads inward, or outward with an inboard extensive system of ducts, covering as completely as possible, the area of the peripheral, and overhead walls themselves, and at times, including the floors, when conditions are conducive to such, as in raised enclosures and mobile homes, etc.

The ducts, being broad and relatively shallow, fit between adjacent framing members, contacting the innermost layer of a peripheral wall, ceiling, or floor, yet are completely separated from air interchange with the interior volume of the enclosure.

An evaporatively-cooled air flow by motor means, through the ducts in hot weather, will preferentially absorb heat from the innermost wall layers by virtue of the outboard insulation blocking or slowing exterior heat influx to the duct layer. This allows the air in the ducts to remain cooler than it would be, otherwise. Thus, the greater part of all the internal peripheral wall area can be considered a giant built-in "cold-wall" heat exchanger. During cold weather, by incorporating a system of conduits carrying hot water adjacent to, or within the innermost wall layers, a "warm-wall" condition will exist and the outboard insulation in this case, will block loss of heat, to the exterior.

In a "cold", or "warm" wall condition, radiant heat exchange is an important contributor to maintaining heat balance within the enclosure volume. However, for best results overall, increasing convective heat exchange and promoting removal of body moisture when warm, by providing air circulation within the enclosure by fan-means, is cost and comfort effective. In hotter weather, some conditioning, be it mechanical vapor-compressive, or by other means, is advantageous to the system in providing humidity control, air filtering and slight positive pressure against infiltration air, tasks which will normally take around one-tenth the energy consumed by a conventional central mechanical, vapor-compressive conditioner.

The installation of the broad duct network can be accomplished during construction of a new dwelling, at the time of inner wall layer or outer wall layer placement, but not after both have been installed. On older dwellings, duct placement may be accomplished by removing the peripheral wall, ceiling and floor innermost layers only, leaving inside room central wall partitions intact. Two duct modalities can be used, depending on commercial viability and investment-to-unit-cost considerations, there being little to no difference in overall ease of installation. In the first mode, the duct lies just outboard of the (homogeneous) innermost wall layer and in contact with it, while in the second mode, the duct is located in the hollow core of the innermost wall layer itself, which is now thickened to form an inboard and outboard plate, surrounding the ducts in its core. In either case, advantage is taken of the duct locations, for placing hot water radiant heating tubes or conduits, which share space in, or between individual ducts.

Another opportunity to accomplish more for less, is taken by installing fire-suppression nozzles in the hot-water tubes, already in place at selected locations, for optimal performance within the interior volume and in wetting down the duct system, itself. All the features described thus far, have been integrated with each other in a synergistic way, one building upon the other and contributing in total to a lower cost, safe, and very habitable environmental system.

The evaporative-cooling of the air flow through the ducts is accomplished by injecting a water mist downstream from a motor-driven fan, in which the mist is directed at right angles to the flow within an insulated plenum of constant cross-section and such that the upstream motor is safely protected from moisture, as is the fan. The atomized mist is controlled automatically by means of a remote feed-back sensor based controller system with a manual override, from cut-off through a condition where excess water in fine droplet form is held in suspension as the flow leaves the plenum; (of constant diameter and smooth-walled), then enters the duct system, proper. No attempt is made to remove this excess water in liquid form, only to adjust the injection rate to prevent unevaporated water from appearing in the exits which are low to the ground. The controller uses a sensor which is placed at or near the exit for detecting and signaling such water excess. This excess, which would be highly objectionable to occupants in an ordinary evaporative cooling system, is deliberately allowed to flow in the system and continue to evaporate inside the ducting as it picks-up heat along the way, thus maintaining a more evenly distributed temperature throughout the walls. As the duct system flow is horizontal or downward from input to exit, there is little chance for liquid pools of water collecting during operation and if so, the ducting, being water-proof, will easily withstand such wetting, while any unwanted collected water may be dried up by passing drier air through at, say the end of the day.

OBJECTS OF THE INVENTION

Accordingly, it is a primary object of this invention to create a fire-safe, cost-effective cooling and heating system for an enclosure's interior volume, combining more efficient multiple heat-reflective and closed-cell layered thermal insulation, peripheral to, or outboard of an active evaporative-cooling system residing wholly within broad shallow ducting, adjacent to the outer surface of the innermost wall layers or ensconced within the hollow core volume of a then-thickened innermost layer and protected by the outboard insulation from external environmental thermal exchange; inward in warm weather, or outward during cold weather.

Another object of this invention is to provide a means for automatically and manually controlling said evaporatively-cooled air saturation and flow while isolating said flow from the interior volume of the dwelling though the aforementioned duct system.

It is further an object of this invention, by efficiently insulating the outer surface of each duct from the external environment, to thereby, bias the exchange of heat by said ducts to the innermost wall layer adjacent to the ducts and thus, to the interior volume.

It is another object of this invention to create the maximum interior radiant and conductive heat exchange surface area possible between the duct system and the enclosure's interior volume within the dwelling's normal structure, without adding bulky or costly external heat exchanger modules.

It is also an object of this invention to provide a non-absorbing, water-resistant duct system, which is thermally intimate with the interior volume of the enclosure throughout the course of said ducting, such that any liquid moisture existing within its volume has the potential to evaporate and increase the cooling power of the duct air flow within its upstream or downstream length before exiting. Thus, aiding in a lowering of the innermost wall panel temperature and subsequently, the interior volume.

An added object of this invention is to provide means for combining a special hot water network of tubes coming from a geothermal, oil, gas, electric or solar hot-water heater, controlled for temperature and flow, such network being located within the wall/ceiling/floor cooling ducts, placed against, or within the innermost peripheral wall, ceiling and floor layers to heat them conductively and thus, the interior volume, convectively and radiantly.

A further object is to suitably attach a plurality of fire suppression nozzles to said tube network, which will spray into said interior volume and into selected ducts in response to excessive heat developing from a fire and to provide a heat activated blocking or damping mechanism within vertical ducting subject to the (chimney) "flue effect".

It is again an object to provide a duct system with heating, cooling and fire suppression means therein, which can be easily installed at the time of original construction, or during general remodeling, when peripheral innermost wall, ceiling layers and floor can be removed.

A further object is to provide selectively-placed fan means to move air within the interior volume in order to increase convective heat transfer to and from said innermost wall, ceiling and floor surfaces and to facilitate said heat transfer from occupants to and from said surfaces.

A final object of this invention, is to remove the need for a primary central mechanical air conditioning system, providing only minimal-size, independent conditioning units (or unit), commensurate with the great reduction in thermal load achieved by "Dynamically Insulating" the dwelling, such auxiliary function to provide slight positive pressure, control the humidity, and counter the thermal loads of infiltration air.

BRIEF DESCRIPTION OF THE SEVERAL VIEWS OF THE DRAWINGS

A clear understanding of the objects and features of this invention will become obvious to those versed in the art by the following detailed description of the preferred form and applications thereof, while being referenced to appropriate drawings by number in which:

FIG. 1 is a schematic perspective of a typical dwelling incorporating the total system.

FIG. 2 is a view in perspective of the air mover.

FIG. 2.1 is a view in perspective of the atomizing unit, primary distribution plenums and water source control.

FIG. 3 is a cutaway side view of the evaporative-cooled air ducting system in the peripheral walls and ceiling.

FIG. 4 is an oblique view from the outboard side of a typical air duct (formed half and flat half separated for clarity) sized to function within standard stud or joist spacing.

FIG. 5 is a schematic diagram of an optional hot water distribution system between the studs, for warming the house by conductive and radiant heat-transfer through the interior wall or ceiling surfaces.

FIG. 6 is the view of FIG. 3, with the addition of hot water pipes in place within a wall or ceiling cooling air duct.

FIG. 7 is an end section of a typical peripheral wall or ceiling space between two adjacent studs or ceiling joists.

FIG. 8 is an end section similar to FIG. 7, but showing an alternate duct and hot water tube configuration within the innermost wall layer.

FIG. 12 is an enlarged view from above of a vertical intermediate hot water heating tube with fire suppression nozzles as shown in FIGS. 6 and 9.

FIG. 13 is an enlarged side view of two fire-suppression nozzles incorporated into the hot water system in a peripheral wall.

FIG. 14 is a side view of the release of a nozzle cap (and spring), in response to heat impinging on the spray unit, due to a fire.

FIG. 15 is a side view-section at mid-height of a vertical duct showing an individual fire damping plate installation.

FIG. 16 is an oblique view of the two-part damper within a typical vertical duct with intermediate hot water tube installed and inner wall layer omitted.

DETAILED DESCRIPTION OF THE INVENTION

Figure 9:
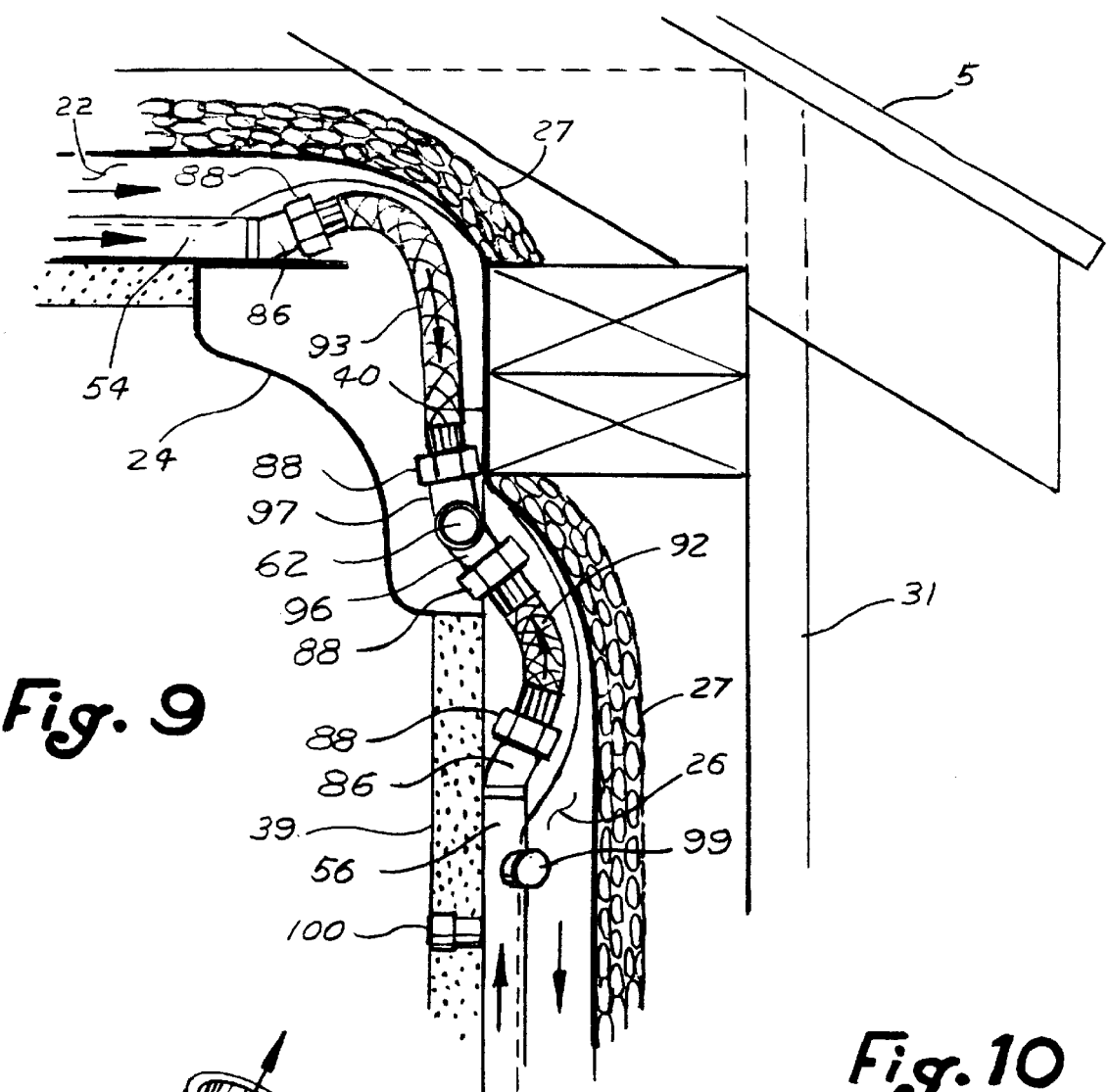
FIG. 9 is an enlarged side view showing two intermediate hot water distribution tubes from wall and ceiling, end connecting to a primary horizontal return tube line to the water heater.

Referring to the drawings, FIG. 1 shows a typical dwelling (1) incorporating the Dynamic Insulation System, wherein the outside air enters evaporative cooling unit (2) through four identical inlet screens (3) mounted on roof (5). Said outside air will remain exterior to interior volume (6) of said dwelling at all times throughout its course. A small, minimum power, window (or wall) mechanical air conditioner (8) provides independent humidity control and infiltration air conditioning/cooling while maintaining slight positive pressure within the interior volume.

Referring to FIG. 2, air moves down through rotating axial fan (7) in unit housing (9) and into humidifier zone (11), containing a ring support structure (13), with two identical water distribution pipes (15), being fed under augmented pressure by pump (25), from city supply and pressure source (16), through filter (17), under control of automatic valve unit (18) located above back-up manual valve (19), said valve being within reach from floor level. Said water is forced to atomize as it leaves a plurality of specially sized orifices (20), said air becoming humidified as it passes into plenum (21) and then distributed through attic ducting (22) (FIG. 3), generally radiating from the central source (23) (FIG. 1), or, if more than one evaporative-cooling unit is used, from the respective locations of each unit, to pass into the peripherally-located soffit ducts (24) at the peripheral wall/ceiling juncture as shown in FIG. 3. Said humidified air follows horizontally (in or out of the page) to pass downward through individual vertical ducting (26) and thence to horizontal baseboard duct (28), said baseboard duct directing the air through screened and flap-protected, multiple exit ports (30) into the outside air, close to foundation (32), the size and number of such ports determined by circulation and volume flow requirements of the particular system of said dwelling.

Valve (18) obtains feed-back through small diameter tube (29) with remote sensor (32) placed in, or near the exit port area for best control. Manual control will rely on cooling need and exit-port water excess observation.

Referring to FIG. 4, an outboard oblique view of two halves of a typical vertical duct (26) reveals an outboard-formed shape (35), which is mated at assembly to an inboard flat surface (36) at respective borders (37), in a manner as shown in FIG. 7 and which is intimate with innermost wall (or ceiling) layer (38). Duct lateral edge assembly and sealing is along inner stud edge (39) at time of application of the inner wall layer (38), with top and bottom edges mating with framing plates (40) and (41), as a thin mastic seal is applied to mating surfaces (42) (FIG. 4) of the two halves of each duct prior to wall board application and nailing. Exit port cut-outs on bottom end of formed duct half (35), identified as (43), with baseboard and soffit duct interface cut-outs (44) and (45) on opposite ends of flat duct half (36), serve as gateways for cooling air passage between soffit duct (24) and vertical duct (26), then to baseboard duct then to baseboard duct (28) through to exit channel (30).

Referring to FIG. 5 and then to FIG. 6, a schematic diagram is first shown of a hot-water based heating system consisting of hot water tank or reservoir (46) with cold water inlet and manual shut-off valve (47) and with normal household hot water outlet (48), which serves as the general household-use hot water source, while a special tap, or bypass outlet (49) from hot water tank (46), leads through pump (50), with over-heat shut-off means (51) for both water and motor, then to a common distribution tube (52) flowing through baseboard duct (28), where periodic intermediate branches (56) occur either at each duct position or some fraction thereof, between a pair of studs or joists (57), as shown in FIG. 7. Said branches follow the course of the mid-line of the cooling ducts, the flat side of said tubes being pressed against the flat inner wall (36) of the duct (26), which in turn lie against the outer surface of innermost wall layer (59), then to re-connect with a common return tube (62) and back to water heater (46). For placement in the ceiling areas, analogous pathways and principals would be followed, if found desirable. In order to mix and transfer heat to and from innermost wall, ceiling (and floor) layers (38), fan unit (68), is typical of a plurality of such, located in various positions within the interior volume (6).

FIG. 7, shows in cross section from above, the broad foot feature (67) of intermediate hot water tube (56) and the formed nesting feature (72) in centerline of cool air duct (26), backed up by high efficiency insulation blanket (27) composed of multiple layers of thermal reflective, polished aluminum foil enclosing several layers of transparent plastic bubbles, formed to fit shape of outboard half of duct (35).

In FIG. 8, showing an optional duct configuration, duct (26) in cross section, is in two laterally adjacent parts (26 a & b), separated by closed channel (74), housing intermediate hot water tube (56), all being part of the core of (thickened) innermost wall layer (38) which is divided into outboard plate (53) and inboard plate (55). Insulation (27) need not be contoured here, as the plates are flat.

As a further option, channel (74) alone, may be used in place of tube (56) for transporting hot water, provided the innermost wall layer material is capable of withstanding the wet heat and water pressure demands, coupled with reshaped adapter/end fittings.

Figure 11:
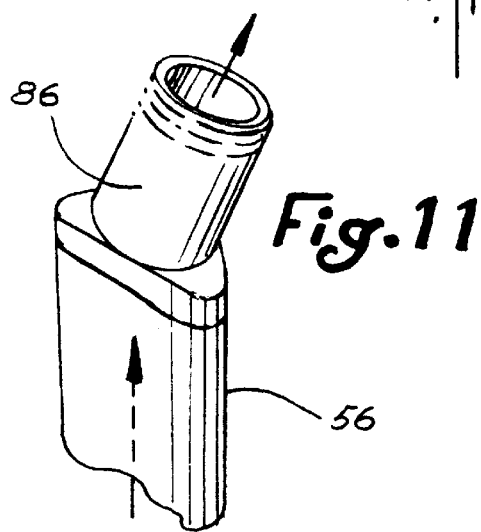
FIG. 11 is a break-out perspective view of an end adapter attached to one end of an intermediate distribution tube.
Figure 10:
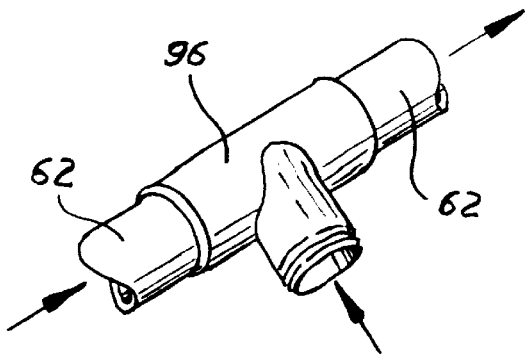
FIG. 10 is a break-out perspective view of a return hot water tube line "Tee" adapter.

Referring to FIG. 9, a typical connecting end of intermediate branch (56) of the system, as shown in FIG. 6, is enlarged and detailed. Branch (56) is connected to angled terminal adapter (86). Identical coupling nuts (88) attach flexible section (92) to return tube (62) through male "Tee" (96), installed in tube (62), which is going in and out of the page. Soffit duct (24) shown in section, also runs "in and out" of the page and contains tube (62) until it reaches water heater (46) of FIG. 5. A typical horizontal intermediate tube (54) in ceiling duct (22) is identical to (56) except for length. It uses same angled adapter (86) and coupling nuts (88) as vertical intermediate branch (56), but with longer flexible section (93); Tee adapter (97) is also identical to (96), but installed at another position along return tube (62). FIG. 10 shows a perspective of "Tee" (96) attached to return tube 62 (the same "Tee" used on tube (52/56) junctures (96) of FIGS. 5 (and 6). FIG. 11 shows assembly of angled adapter (86) to end of a typical intermediate tube such as (56) in wall, or (54) in ceiling duct. Adapter end of (56) is joined with sealable slip-in fit to adapter (86).

Advantage, at very little added cost is taken of the water availability, for automatic fire suppression units as shown in FIGS. 12, 13 and 14. Two types of units are illustrated. Unit (99), shown in perspective in place on tube (56) sprays into vertical duct (26), while unit (100) sprays into interior volume (6) of dwelling (1) and is described thusly; A threaded adapter (103) is tapped into a section of existing tube (56), said adapter being drilled on its center line to allow a fixed spray of water to emerge at its tip (104) whenever resilient disc (111) covering said tip, is pulled away by cap (113), if it is heated sufficiently to melt low temperature solder (115) between the turned lip of cap (113) and sleeve cylinder (114). Compressed spring (116), seated in sleeve (114) provides sufficient breakaway force to remove cap (113) with spring (116) and resilient disc (111) completely. Tapped joint adapter (103) and sleeve (114) are designed to hold the hot-water tube section firmly in place against the inner wall layer (38), when adapter (103) is screwed down, as well as to allow re-soldering of cover (113) over disc seal (111) and spring (116) while unit is in place in the wall. As an added safety feature, fire-blocking at mid-height region of the vertical duct is shown in FIGS. 15 and 16, wherein a typical vertical duct inside view and oblique view shows an insulated fire damper plate (118) and torsion spring (119) in a normal downward locked position (solid lines), held in place by hook (120) at the lower central wire loop (121) and by two helical screws (122) at upper ends of torsion spring (119), in which small formed loops (123) act as single female thread(s), catching said helical screws sufficient to bind ends to inner wall layer (38) as a stable reaction point. Straight end of hook (124) passes through innermost wall layer (38) and cup washer (125), to be soldered as a fillet to said washer at their common intersection (126), using low melting point material, which will melt and release said spring, lower loop and fire damper plate as one, to rotate into horizontal position against formed ridge (127) and block upward hot air (or flame) travel within said ducting during a fire, augmenting the aforementioned duct fire sprinkler system by restricting the flue effect in said duct.

While there has been shown and described a preferred embodiment of the "Dynamic Insulation" system of cooling, heating and fire protective features herein, it is understood that changes in structural arrangement, material sizes and shapes can be made by those skilled in the art without departing from the scope of the invention.

I claim:

1. A system for protecting the interior volume of an enclosure against adverse thermal exchange with the exterior environment enclosure and destruction by fire, comprising of:

(a). A floor plane structure, free of adverse thermal exchange, with said exterior environment, supporting;

(b). Three, or more, end-connected, upstanding peripheral walls, collectively bearing a top, cover structure;

(c). Said walls and cover being of double-layer construction, an innermost an outermost, wherein, periodic elongate stiffening members maintain sufficient separation of said layers, one from the other, forming a space;

(d). Extensive system of water-resistant enclosed channels or ducts, ensconced within or forming an elongate core volume of said innermost layers of said peripheral wall and top cover structure, thereby separating said innermost layer into an outboard plate and an inboard plate, surrounding said core volumes;

(e). Means for introducing outside air to said duct system separated from said interior volume and means for exhausting said air to said exterior environment;

(f). Means for supplying and directing atomized water in a substantially perpendicular direction to said air introduction means, within a plenum for the purpose of evaporatively cooling said air, said plenum being insulated externally thereupon and extending at substantially constant cross section beyond said introduction of water for a distance greater than the nominal diameter of said plenum;

(g). Means for automatic and manual control of said water introduction; means control means being from complete shut-off to a condition of excess water suspension in said air flow;

(h). An insulation layer encompassing said wall and top cover duct system, outboard thereof and inboard of said enclosure's outermost layers, for suppressing exterior thermal transfer to or from said duct system and contents therein;

(i). Means for interior heating and fire suppression;

(j). Limited dehumidifying and cooling means with an independent interior air circulation means.

2. The system, as set forth in claim 1, with said interior heating means being a closed-circuit network of hot water-transporting tubes, set adjacent said ducts, in said core volume of said innermost layer, devised and arranged to circulate by municipal line pressure or auxiliary pump means from a hot water source and return, with automatic and manual control means for temperature, including turn-on, turn-off and metered flow, whereas appropriate intermediate branches of said tubes, contain at least one flat surface contiguous with said outboard surface of said inboard plate of said core volume, for enhanced thermal exchange with said interior volume.

3. The system and features as set forth in claim 2, wherein said insulation is composed of multiple layers of thermally reflective, polished aluminum foil, enclosing a plurality of layers of transparent plastic closed-cell bubbles, adjoined thereto.

4. The system as set forth in claim 2, wherein said interior heating means being a closed circuit network of hot water transporting tubes, selected branches therein, being attached in a water-tight manner by appropriate adapter or coupling means to both ends of appropriate elongate core channels of said thickened innermost wall and top cover layers, when said layers are constructed, using materials and processes suitable for maintaining a durable, and reliable transport of said hot water through said core channels and said network.

5. An enclosure, as set forth in claim 2, wherein a combination of vertical to inward-leaning peripheral walls meet directly at an edge-line or point;

(e). An innermost, substantially horizontal ceiling layer, optionally located at a distance below said uppermost edge line or point, thus creating an attic space, below which, said insulation-active-cooling and heating duct system resides, supported from above by contiguous periodic elongate stiffening members for heating and cooling of said interior volume by reduction of ceiling height above said floor plane.

6. An enclosure, as set forth in claim 2, wherein, said floor plane, being sufficiently above ground level and subject to adverse thermal exchange with the external environment, being attachable to all aforementioned enclosing structures thereabove, is composed of double layers, stabilized by elongate spacer elements, containing:

(a). A system of inboard evaporative-cooling ducts and outboard insulation-layer combination, therein;

(b). Including said hot-water tube network for said peripheral walls and said top cover therein.

7. A system for thermal insulation with active cooling and heating of the innermost wall layers adjacent the interior volume of an enclosure, said enclosure, subject to adverse thermal exchange with the exterior environment, comprising of:

(a). A horizontal floor plane structure, residing at or near ground level, or otherwise free from adverse exposure to said environment, supporting three, or more, end-connected, upstanding peripheral walls, collectively bearing a substantially horizontal ceiling, with overlying roof layer;

(b). Said peripheral walls consisting of two flat layers, an outermost and an innermost, so separated as to form a space, containing periodic, upstanding, elongate stiffeners or studs therebetween;

(c). Said ceiling, supported from above, by a plurality of upper joists, attached thereto, with said floor supported by and attached to a plurality of lower horizontal joists and/or aggregate slab;

(d). A water and corrosion-resistant outermost roof layer, installed superiorly contiguous to, or at a distance above said upper joist;

(e). An extensive system of two-piece water-resistant, closed ducts, the outboard half, being formed, the inboard half, being flat, physically isolated throughout, from said interior volume, residing within said spacing in said upstanding wall and ceiling;

(f). Said inboard duct half disposed adjacent and adjoining the outboard face of said innermost wall and ceiling layer;

(g). Motor means for introducing evaporatively-cooled air to said duct system and means for exhausting said air to an external exits;

(h). Means for creating atomized water released at a substantially perpendicular direction to said air flow introduction means within a plenum, insulated externally thereupon and extending at a substantially constant cross-section beyond said introduction of water, for a distance greater than the nominal diameter of said plenum;

(i). Means for automatic and manual control of said water introduction from shut-off to an excess of water in suspension in said air flow;

(j) Said automatic control means having feed-back sensor means sufficient to measure excess liquid water presence near said duct exit;

(k). Said manual control means being accessible to an operator individual cognizant of said exit moisture condition;

(l). An insulation layer, encompassing said wall and ceiling ducts system, outboard thereof, and inboard of said outermost peripheral wall layer and said outermost roof layer of said enclosure, for suppressing exterior thermal exchange with said duct system and contents therein, thereby causing heat to be preferentially exchanged with said innermost layers surrounding said interior volume;

(m). cooling and dehumidifier means, of power requirement less than fifteen percent of a conventional central air-conditioning power required to meet all said enclosure or dwelling cooling needs alone;

(n). One, or more independent air-mover means within said interior volume for convective mixing of said interior volume air;

(o). Means for interior volume heating and fire suppression;

(p). Means for fire damping within said ducts for countering upward fire progression caused by said flue-effect.

8. The system set forth in claim 7, with the addition of a closed-circuit network of water-proof tubes, appropriate intermediate branches thereof configured with a minimum of one flat surface residing contiguous to the outboard surface of said innermost layers of said peripheral walls and ceiling, while residing within said ducting system, devised and arranged to circulate by municipal line pressure or auxiliary pump means from a hot water source and return, with control means, automatic and manual, for temperature, turn-on, shut-off and metering of flow, said hot water thus circulated, to be capable of transmitting by conductive and radiant means, thermal energy to said innermost wall and ceiling surfaces, thence to the aforementioned interior volume by radiation and convection;

(a). A plurality of heat-activated fire-suppression nozzles, attached to said tube network in a water-tight manner, in a variety of location, determined by need, the first mode extending inward through said innermost wall and ceiling layers sufficient to direct adequate fire-suppression spray patterns into said interior volume of a dwelling or enclosure, and the second mode installed with spray directed into said ducting system itself, including the aforementioned plenum unit and distribution branches as deemed advantageous.

9. The system and features as set forth in claim 8, wherein said insulation is composed of multiple layers of thermally reflective, polished aluminum foil, enclosing a plurality of layers of transparent plastic closed-cell bubbles, adjoined thereto.

10. An enclosure, as set forth in claim 8, wherein a combination of vertical to inward-leaning peripheral walls meet directly at an edge-line or point;

(a). An innermost, substantially horizontal ceiling layer, optionally located at a distance below said uppermost edge line or point, thus creating an attic space, below which, said insulation-active-cooling and heating duct system (Dynamic Insulation) resides, supported from above by contiguous periodic elongate stiffening members, to improve performance in heating and cooling of said interior volume by reduction of ceiling height above said floor plane.

11. The system as set forth in claim 7, wherein, said floor plane, being sufficiently above ground level and subject to adverse exterior thermal exchange; includes said closed-circuit hot-water tube network, said cooling duct system and said insulation layer combination described for said peripheral walls and ceiling therein.

12. The system as set forth in claim 7, wherein an enclosure, wherein one or more end-joined, peripheral walls being of curved to flat configuration, support a top cover or curved extension of themselves, all being of double layer, rigid, flexible, or semi-flexible material, internally supported by periodic elongate, rigid, straight or curved supporting members, forming a series of channels therein, an extensive system of water resistant flexible ducts filling said channels and being integral or thermally intimate with said, innermost wall layer;

(a). Efficient insulation of multi-layer closed cell and heat-reflective foil, attached to said outboard surface of said ducts and inboard of said outermost wall layer;

(b). Said duct system supplied with evaporatively cooled forced air, by automatic and manual controlled water-mist injection means, through an introductory plenum and flexible distribution duct means, thence through said duct system means to exit into said exterior environment, isolated from input to output from said interior volume of said enclosure, said cooling duct system being collapsible and expandable by blower means, said elongate supports being removable therefrom for portability;

(c). A floor supportive floor layer detachable and portable with said above ground enclosing structures, free of said flexible ducting and insulation.

\* \* \* \* \*